United States Patent [19]

Dou et al.

[11] Patent Number: 5,289,976
[45] Date of Patent: Mar. 1, 1994

[54] HEAVY HYDROCARBON FEED ATOMIZATION

[75] Inventors: Suisheng M. Dou, Lawrenceville; Allen R. Hansen, Glassboro, both of N.J.; Steven C. Heidenreich, Houston, Tex.; William J. Hillier, Houston, Tex.; Phillip K. Niccum, Houston, Tex.; Maury I. Schlossman, Katy, Tex.

[73] Assignees: Mobil Oil Corporation, Fairfax, Va.; The M.W. Kellogg Co., Houston, Tex.

[21] Appl. No.: 66,595

[22] Filed: May 25, 1993

Related U.S. Application Data

[63] Continuation of Ser. No. 808,266, Dec. 13, 1991, abandoned.

[51] Int. Cl.⁵ .................................................. B05B 7/00
[52] U.S. Cl. ...................................... 239/431; 239/432; 239/434; 239/590.5
[58] Field of Search .................... 239/398, 590, 590.5, 239/429, 432, 430, 431, 434

[56] References Cited

U.S. PATENT DOCUMENTS

| | | | |
|---|---|---|---|
| 693,938 | 2/1902 | Witt . | |
| 860,259 | 7/1907 | Smith | 239/429 |
| 949,913 | 2/1910 | Russen | 239/432 |
| 1,063,913 | 6/1913 | Cornelius | 239/429 |
| 1,114,450 | 10/1914 | Denman | 239/429 |
| 1,526,061 | 2/1925 | Glendenning | 239/431 |
| 3,051,397 | 8/1962 | Hanson | 239/432 |
| 3,215,352 | 11/1965 | Meraz, Jr. | 239/432 |
| 3,650,476 | 3/1972 | Rackley et al. | 239/432 |
| 3,829,013 | 8/1974 | Ratnik | 239/432 |
| 3,867,092 | 2/1975 | Sage et al. | 239/432 |
| 3,902,671 | 9/1975 | Symmons | 239/428 |
| 3,929,290 | 12/1975 | Tallarovic | 239/432 |
| 4,383,649 | 5/1983 | Reed et al. | 239/429 |
| 4,434,049 | 2/1984 | Dean et al. | 208/153 |
| 4,564,502 | 1/1986 | Skraba | 422/140 |
| 4,625,916 | 12/1986 | Nieuwkamp et al. | 239/431 |
| 4,681,743 | 7/1987 | Skraba | 422/140 |
| 4,815,665 | 3/1989 | Haruch | 239/432 |

FOREIGN PATENT DOCUMENTS

| | | |
|---|---|---|
| 0312428 | 4/1989 | European Pat. Off. . |
| 0318185 | 5/1989 | European Pat. Off. . |
| 648289 | 7/1937 | Fed. Rep. of Germany ...... 239/398 |
| 474904 | 1/1915 | France ................ 239/431 |
| WO9011337 | 4/1990 | World Int. Prop. O. . |

Primary Examiner—David M. Mitchell
Assistant Examiner—Christopher G. Trainor
Attorney, Agent, or Firm—Alexander J. McKillop; Malcolm D. Keen; Richard D. Stone

[57] ABSTRACT

A nozzle, and FCC process using the nozzle for atomizing heavy feed to a riser reactor, are disclosed. A liquid feed stream is atomized by radial out-to-in impingement of atomizing vapor, discharged onto an impingement plug in an annular expansion region, then sprayed through an outlet. Baffles at the expansion region outlet, and an orifice outlet improve feed atomization and feed/FCC catalyst contact in a riser reactor. The nozzle may be used to distribute liquid over other reactor beds, or to add liquid to distillation columns.

15 Claims, 2 Drawing Sheets

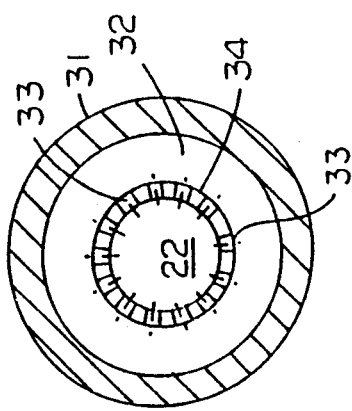
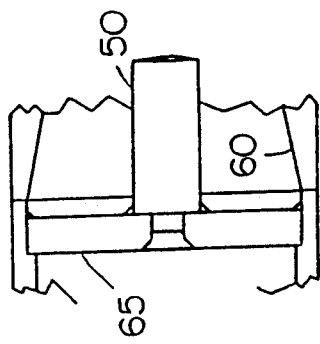
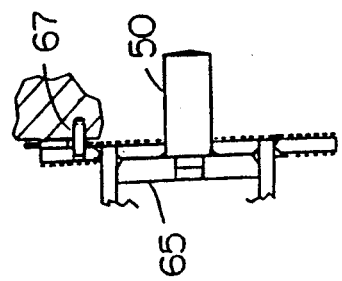
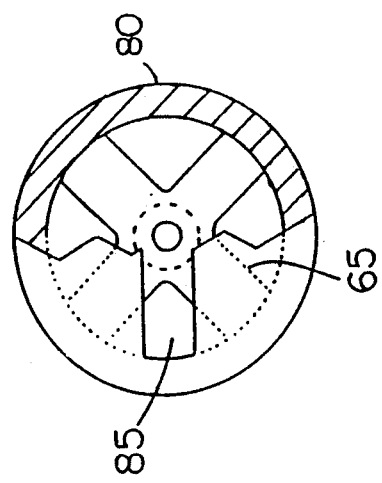
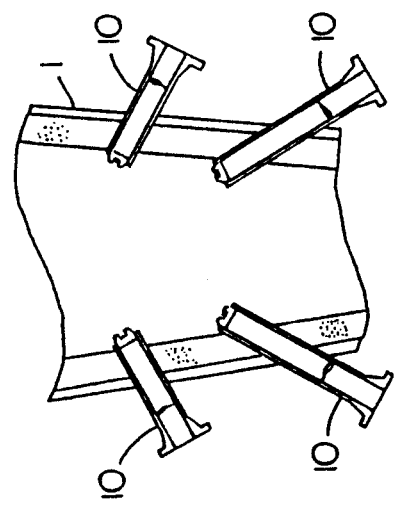

HEAVY HYDROCARBON FEED ATOMIZATION

This is a continuation of copending application Ser. No. 07/808,266, filed on Dec. 13, 1991 now abandoned.

BACKGROUND OF THE INVENTION

1. Field of the Invention

The invention relates to a process for atomizing liquid feed to refinery process, such as distillation columns or an FCC riser reactor and to an apparatus for atomizing liquids.

2. Description of Related Art

Refiners have long known that feed atomization in the base of FCC riser reactors is a problem. It is difficult to contact many tons per hour of hot, regenerated cracking catalyst with large volumes of heavy oil feed, and ensure complete vaporization of the feed in the base of the riser reactor. Part of the problem is use of heavier feeds in FCC units. Many PCC's now process significant amounts, on the order of 5-20% of resid or non-distillable material. These materials are almost impossible to vaporize in fractionators, so vaporizing them in less than a second or so in an FCC riser reactor is a formidable task.

Part of the problem is that feed nozzles which were perfectly satisfactory for adding a readily vaporizable feed, such as a gas oil, are no longer adequate for heavier feeds. The problems are twofold: the heavier feeds are harder to vaporize because of their high boiling points, and the heavy feeds are harder to atomize because of their high viscosity even at the high temperatures existing in FCC riser reactors.

Efforts of refiners to cope with heavier feeds, or improve the vaporization of lighter ones, will be briefly reviewed.

Some of the efforts at improving regenerated catalyst/feed contacting were on the catalyst side, i.e., the use of lift gas to smoothly lift catalyst up into the riser. Other approaches assumed that catalyst distribution will be poor and forced oil distribution (via multiple nozzles) to be equally poor.

Increased steam addition is common practice for dealing with heavier feeds. Increased atomization steam usually leads to increased pressure drop across the existing feed nozzles, and increased sour water production. Although some improvement in feed dispersion is usually achieved, the problems of increased sour water production, and limits on pressure at which feed can be delivered to the nozzle inlets, limit the improvement from merely increasing steam rate.

In addition to focussing on catalyst/oil distribution and making existing nozzles work better with more steam refiners considered other nozzle designs. Some very effective nozzle designs were developed but required unusually high pressure drops across the nozzle for effective operation. Refiners like to operate the feed nozzles at as low a pressure as possible, both to save on capital equipment and operating cost. Many units are limited in the feed pressure, and major capital improvements are needed to use high pressure drop nozzles. Development of high pressure liquid streams also consumes a considerable amount of energy.

A good overview of developments in nozzles is presented in Fluid Catalytic Cracking Report: 50 Years of Catalytic Cracking; A. A. Avidan et al, Oil & Gas Journal, Jan. 8, 1990, at page 50. Open pipe or slotted, impact, spiral and critical venturi nozzles have all been tried.

The open pipe or slotted nozzle gives coarse irregular droplet sizes and is not ideally suitable for injecting heavy feeds into an FCC riser reactor.

Critical venturi nozzles, where an oil and steam mixture is passed through a critically sized venturi section into a larger, intermediate chamber and are discharged through a restricted nozzle can achieve very small droplet sizes. These droplets can be completely vaporized in less time than the droplets produced by spiral nozzles, but such nozzles require high liquid pressure drops, and develop a narrow spray pattern.

A hybrid approach, use of high velocity steam (1000 to 1800 ft/sec) to atomize a low velocity oil stream (20 to 50 ft/sec) was disclosed in U.S. Pat. No. 3,654,140, which is incorporated herein by reference. The high velocity steam imparts energy to the low velocity liquid. FIG. 2 of '140 shows oil discharged as a cone of liquid which is broken into droplets by a high velocity steam stream enveloping the cone. The design was an improvement over the nozzle shown in U.S. Pat. No. 3,152,065, an earlier nozzle developed by the same assignee, wherein liquid passed through an annular region about a central steam pipe to contact an expanding steam stream upstream of a restricted opening. Imparting a centrifugal component to the liquid stream probably threw the liquid to the sides of the nozzle, and may have impaired atomization. The liquid went out as a cone and was not impinged by the high velocity steam stream in the central region of the nozzle.

Although there are myriad nozzle designs, many of which are unique and hard to classify, they can be more or less arbitrarily classified as relying on one or more of the following mechanisms for drop formation.

Expansion is the most widely used form of FCC feed nozzle. A mixture of 1-5 wt. % atomizing steam and the heavy, preheated feed, pass through a slot or circular orifice to form a spray.

Mixing/Expansion involves use of swirl vanes followed by an orifice.

Shear/Breaking atomizes liquid by passing it through a spiral-shaped orifice. Spiral FCC feed nozzles are examples.

Impingement nozzles pass an atomizing gas stream through multiple orifices to strike a liquid stream. The Lechler nozzle is a good example of this type of nozzle.

Breaking/Mixing nozzles atomize by the high velocity impact of two phases. The Snowjet nozzle is of this type.

Although it might seem possible to simply stack these types of nozzles in series, and thereby improve atomization, this is not possible in practice. Additional stages may or may not improve atomization, but will always increase pressure drop and this alone will usually prevent simple stacking of these unit operations. Many attempts to improve nozzle performance, as by stacking atomizing devices, degrade performance. We tried adding swirl vanes to a nozzle, and found that they actually made the distribution worse.

In FCC units, the nozzles must also be robust and reliable, as run lengths of one or two years or more are common. FCC units have additional constraints. The hydrocarbon feeds are supplied at a certain pressure, usually around 50-200 psig. Because of the large size of these streams, and the cost of energy needed to pump the feed to higher pressures, and site constraints which frequently prevent easy addition of high pressure pumps, it is very important to have a nozzle which will work well with relatively low oil pressures.

High pressure steam is usually readily available, and is a preferred atomization medium, but refiners usually want to minimize its use. High pressure steam is a valuable commodity in a refinery, and its use fills much of the FCC riser and downstream processing equipment with an inert material. Refiners are also reluctant to use too much steam, or to have too high an exit velocity from the nozzle, because of catalyst erosion, and riser impingement concerns previously noted.

Nozzle exit velocities, regardless of the internal oil or steam pressure required by the nozzle, should not be excessive because high velocity streams can shorten catalyst life, by attrition.

An additional constraint is that the material exiting the nozzle should contact as much of the catalyst flowing by the nozzle as possible, without carrying through the catalyst to a side portion of the riser.

It is also beneficial if the nozzles used, whether vertical or side mounted, are relatively small, so that flow of hot catalyst up the riser is not disrupted.

We realized a different approach was needed in nozzle design. Our nozzle combines several different mechanisms for droplet formation, and achieves efficient atomization, with relatively low amounts of atomizing fluid, without requiring inordinately high oil feed pressures, or impinging on the wall of the riser reactor. Our nozzle design does not exhibit slugging characteristics, and can be mounted either vertically or at a slant, which permits its use in riser reactors having side mounted nozzles. The design is both robust and compact, and catalyst flows readily around it.

BRIEF SUMMARY OF THE INVENTION

Accordingly, the present invention provides a fluidized catalytic cracking process wherein a heavy feed is catalytically cracked in a riser cracking reactor means to produce cracked products and spent catalyst, spent catalyst is stripped in a stripping means and regenerated in a catalyst regeneration means to produce hot regenerated catalyst which is recycled to said riser reactor, characterized by use of at least one multi-stage atomizing feed nozzle to inject feed in a base portion of said riser reactor, said nozzle comprising: an initial atomization section wherein atomizing gas is charged, in radial out-to-in flow, into a flowing stream containing liquid hydrocarbon, to partially atomize said liquid feed stream and produce a partially atomized jet having a diameter and cross sectional area and having a less atomized core region and a more atomized peripheral region; an impingement section contiguous with and downstream of said initial atomization section, and having a diameter no greater than the diameter of said initial atomization section; an annular expansion region about said impingement section, said expansion region having a cross sectional area at least as large as said partially atomized jet and connective with a nozzle barrel having a cross sectional area at least twice as large as the cross sectional area of said partially atomized jet; and a nozzle outlet having a cross sectional area smaller than the cross sectional area of said nozzle barrel at an end of said nozzle barrel.

In another embodiment, the present invention provides a fluidized catalytic cracking process wherein a heavy feed is catalytically cracked in a riser cracking reactor means to produce cracked products and spent catalyst, spent catalyst is stripped in a stripping means and regenerated in a catalyst regeneration means to produce hot regenerated catalyst which is recycled to said riser reactor, characterized by use of a plurality of multi-stage atomizing feed nozzles to inject feed in a base portion of said riser reactor, said nozzles comprising: an initial atomization section wherein atomizing gas is charged, in radial out to in flow, into a flowing stream containing liquid hydrocarbon, to partially atomize said liquid feed stream and produce a partially atomized jet having a diameter and cross sectional area and having a less atomized core region comprising atomized droplets having a Sauter mean diameter at least 50% greater than the Sauter mean diameter of droplets in a more atomized peripheral region; an impingement section axially aligned with and contiguous with and downstream of said initial atomization section, and having a diameter no greater than the diameter of said initial atomization section, said impingement section comprising a cylindrical plug having a conical end portion with an angle no greater than 20°, an upstream end and a downstream end which is axially aligned with said initial atomization section, and wherein the plug is supported at the downstream end thereof; an annular expansion region, axially aligned with and encompassing said impingement section, said expansion region having a cross sectional area at least as large as said partially atomized jet, having an inlet encompassing said impingement section and an outlet connective with a nozzle barrel having a cross sectional area at least twice as large as the cross sectional area of said partially atomized jet, and wherein said outlet comprises an X or cross-shaped impingement plug support means having a cross sectional area, perpendicular to fluid flow, equal to 40 to 60% of the area available for fluid flow immediately upstream of the support means, and wherein said impingement plug support means splits fluid flowing through the outlet of the expansion region into four pie shaped streams; and a cylindrical nozzle barrel axially aligned with and contiguous with said expansion region outlet, said barrel having a cross sectional area, a length and a diameter, and a length to diameter ratio of 3:1 to 6:1, and having a single, rectangular, notch outlet adapted to produce a flat, fan shaped spray, said notch outlet having a cross sectional area smaller than the cross sectional area of said nozzle barrel.

In an apparatus embodiment, the present invention provides an atomizing nozzle comprising: an initial atomizer having a generally cylindrical inner surface having an axis, a diameter and a cross sectional area, a first end, a second end, a borehole extending from the first end to the second end, a liquid feed inlet connective with the first end, a plurality of radially distributed atomizing gas inlets drilled through said cylinder and within one diameter of the second end; an impingement atomizer having an axis which is axially aligned with the axis of said initial atomizer, a first end, a second end, a generally cylindrical plug having a diameter, a plug first end near the atomizing section and a plug second end, said plug in axial alignment with said initial atomizer and wherein said plug first end is in open fluid communication with said second end of said initial atomizer; an annular expansion region consisting of a truncated cone having an angle of less than 20°, a first end near the apex thereof connective with said second end of said initial atomizer and a second end connective with a nozzle barrel, and enveloping said impingement atomizer; a cylindrical nozzle barrel having an axis and axially aligned with said initial atomizer, a diameter at least twice as large as the diameter of said initial atomizer, a first end connective with the second end of said annular expansion region, and a second end connective with an orifice outlet.

Other embodiments relate to use of the nozzle of the invention to add liquid feeds to distillation columns and other hydrocarbon conversion processes.

BRIEF DESCRIPTION OF THE DRAWINGS

FIGS. 6 and 7 show different views of the low pressure drop plug and baffle.

FIG. 8 is a cross sectional view of the initial atomizing section.

FIG. 9 is a cross sectional view of an FCC riser reactor with a plurality of feed nozzles.

FIG. 10 is a cross sectional view of the expansion plug, showing a preferred anchoring means.

DESCRIPTION OF THE PREFERRED EMBODIMENTS

Prior Art FCC Feed Nozzles

Figures 1, 2, 3, 4, 5:
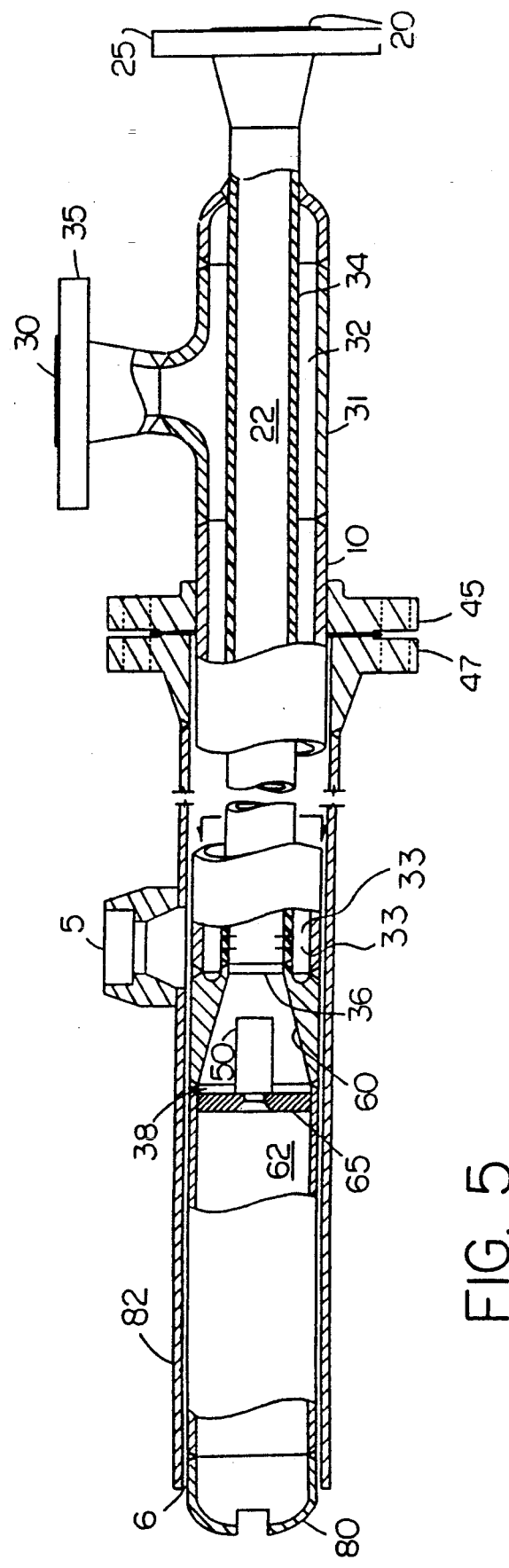
FIG. 1 and FIG. 2 (prior art) show different views of a 180° degree slotted cap nozzle outlet.
FIGS. 3 and 4 show views of a shortened slot nozzle outlet.
FIG. 5 shows a cross sectional view of a preferred nozzle of the invention, with an initial atomizing section, low pressure drop plug and baffle (which also serves as an expansion section) and a shortened slot nozzle outlet.

The state of the art in regard to FCC feed nozzles, or at least feed nozzle outlets, is represented by FIGS. 1 and 2. The end of the nozzle 80', with notch or slot 85', sprays liquid feed into FCC risers. The feed upstream of the nozzle is an atomized mixture of steam, or other atomizing fluid, and liquid hydrocarbon feed, usually with a minor amount of vaporized hydrocarbon feed. The slot orifice 85' is usually a cut out or ground out portion of the end cap 80'. Typically the slot orifice has 180° opening, and has a width or open portion equivalent to 15–50% of the diameter of the pipe or end cap 80' containing the slot orifice.

In these orifice nozzles, or those shown in the Oil and Gas Journal report, oil and steam are injected into a pipe, the end of which terminates in a reduced diameter orifice. The nozzle atomizes or disperses the oil by imparting a high velocity to the oil and atomizing steam. Poor results are obtained, especially with heavy, difficult to vaporize feeds. These nozzles were satisfactory when processing readily distillable feeds, such as gas oils, but their deficiencies become more evident with feeds containing more than about 5 wt. % non-distillable material. The problem is that much of the liquid feed is poorly atomized. The large liquid droplets can take a long time to vaporize, or may not vaporize at all and form coke. In some units the feed is not vaporized until after the catalyst is significantly deactivated.

The FCC process and nozzle of the present invention use several mechanisms to form finely atomized droplets of heavy oil. An overview of the three atomization stages or mechanisms of a preferred nozzle follows, with primary reference to FIG. 5, and passing reference to other Figs.

Briefly, the nozzle will have an initial atomization section, a low pressure drop impingement and expansion section, and an orifice tip.

Initial Atomization

The heavy oil or heavy liquid feed is charged via inlet 20 to atomizing chamber 22 of nozzle 10. Flange assembly 45 mates with flange 47 and nozzle shield 82 which extends into the FCC riser reactor.

The oil comes in inlet 20, usually as a liquid phase, and is atomized to a considerable extent as it flows through chamber 22 by the injection of high pressure steam transversely into the flowing liquid. High pressure steam is admitted via atomizing fluid inlet 30. Flanges 35 and 25 around inlets 20 and 30, respectively, permit field connection of steam and oil lines.

The high pressure steam enters into the annular space 32 between the walls 34 of atomization chamber 22 and the walls 31 of nozzle 10. High pressure steam passes through a plurality of holes 33 preferably drilled at right angles through pipe wall 34.

The heavy oil feed is vigorously mixed, and atomized to a significant extent, as it passes from inlet 20 to outlet 36 of the initial atomization zone. The liquid thus flows axially and the gas passes radially from the annular region 32 surrounding region 22.

FIG. 8, a section of region 22 taken near the outlet end thereof, shows how steam can flow from the annular steam passageway 32 through holes 33 in pipe 34 to enter region 22 and atomize liquid feed flowing therethrough. 2 rows of 8 holes each are preferred.

FIG. 5 shows the preferred arrangement of steam holes 33, within one or two pipe diameters upstream of the outlet 36 of this section. Preferably the steam holes are as close as possible to outlet 36, within $\frac{1}{2}$". If desired, these steam injection holes can be shifted upstream, or supplanted with additional steam injection means, such as slots, tubes, or minor amounts of steam added with the heavy oil feed.

Low Pressure Drop Impingement/Expansion

The atomized two phase mixture from outlet 36 is discharged into a low pressure drop impingement and expansion section.

The first step is discharge of the oil/steam mixture directly onto impingement plug 50, which preferably has a cross sectional area no greater than that of the atomizing chamber 22. Ideally, the impingement plug will have a cross sectional area from 30 to 60% of the cross sectional area of pipe 34. If pipe 34 is $1\frac{1}{2}$" Schedule 80 pipe the optimum cross sectional area of plug 50 is around 1". This is large enough to allow for impaction.

Pin 50 should be placed within a low pressure drop expansion region which permits efficient expansion of atomized oil and steam through this portion of the nozzle. The use of a truncated, inverted cone section 60 having an ID approaching or equalling that of the ID of the outlet of region 22 in pipe 34, and an angle of 5° to 30° from centerline, preferably 10° to 25°, and most preferably 15°, will minimize pressure losses due to expansion. More complex geometries, such as those used in venturi meters or carburetors may also be used, but such shapes are harder to fabricate and more expensive. Pin 50 may be somewhat displaced from, or recessed from, the outlet 36 of the initial atomization section, along the direction of liquid flow, by an amount equal to $\frac{1}{2}$ or more of the diameter of outlet 36.

The angle of the inverted cone section 60, and the amount of recess of the impingement plug 50 from outlet 36, should be sufficient to provide a cross sectional area available for fluid flow around plug 50 at least equal to that of the cross sectional area available for fluid flow within pipe 34. Preferably the minimum open area of the pipe around the plug is at least 130% or more of the cross sectional area of pipe 34. We believe the best spacing is one which will provide about 1.43 times the open area of the feed pipe 34.

FIG. 7 shows a cross sectional view of a preferred impingement plug 50. The major purpose of plug 50 is as an impactor, upon which the atomized mixture of oil and steam strikes and further atomization occurs. Preferably the end of the plug is cut at a slight angle, ranging from 2° or 3° to perhaps as much as 15° or 20°, and ideally around 10°. This shallow angle allows for a strong impact of liquid and atomizing fluid against the plug and good atomization, while simultaneously channelling flow evenly around the plug and into the expansion section next to and downstream of the end of plug 50. The plug channels the atomized mixture away from the center of the pipe into the expansion section.

The expansion section should have an outlet diameter roughly equal to that of the bore of the pipe or tube leading to the nozzle outlet. Preferably the expansion section terminates with a baffle section 65. Preferably the baffle is roughly in the form of a cross or "X", defining four pie shaped openings through which atomized feed passes. These baffles, shown as an interior view in FIG. 6, preferably have a spoke width equal to 15 to 35% of the width of the diameter of the outlet of the expansion section. Ideally, the crossed baffles will have a spoke width of 20 to 30%. A preferred design is the one shown, with a baffle plate having a thickness of ¼", and each 'prong' having a width of 0.688", for use within a 3" pipe.

This baffle design provides a good stage of mixing, and provides enough metal or other material to support impingement plug 50. Another alternative is to use only a single baffle means 85, usually of somewhat greater diameter, to split flow exiting the expansion section into two streams. Another alternative is to use a solid plate, with 2, 3, 4 or more holes drilled in the plate. Use of a solid plate with 4 holes drilled in it will behave hydraulically much like the "X" baffle shown by dotted lines in FIG. 6.

Regardless of the exact shape or configuration of the baffle means 65, it is important to have sufficient open area so that there will be only a modest pressure drop across the baffle. Usually providing an open area of at least 25% of the cross sectional area of the outlet of the expansion section will suffice.

FIG. 10 shows a preferred way of fabricating the plug and baffle assembly, relying on pin 67 to ensure proper placement of the assembly in the nozzle. Field fabrication is greatly simplified, as the unit can not be installed backwards. Field replacement is also easy with such a design.

Baffles 65 promote further mixing of steam and oil, and ensure that the region of the nozzle downstream of the expansion section, and upstream of the nozzle outlet, i.e., the bore of the nozzle outlet, is loaded with an atomized mixture having a uniform droplet size and spray concentration. To this end, spiral mixers, swirl vanes, or baffle sections of varying geometry may be inserted at, or immediately upstream or downstream of the outlet of expansion section, but not necessarily with the same results.

There is a small pressure drop associated with the use of a plug, or plug and baffle, but this pressure drop is efficiently used by the system to atomize the mixture.

Orifice Tip

The method and apparatus of the present invention can use conventional orifice technology to discharge the atomized mixture into the riser reactor. In general, such orifices work best when the cross sectional area of the orifice is significantly less than the cross sectional area of the snout or barrel just upstream of the orifice. Broad variation in snout:slot areas is possible, but a 3.8:1 ratio gives good results.

The orifice may have additional atomizing means within or just downstream of the orifice tip, such as a spiral nozzle, but these generally will not be needed, and will increase the pressure drop, complexity, and failure rate unduly.

A slot orifice, in the form of a notch or slot 85 is shown in FIG. 6. This forms a flat fan spray with an angle less than 180°. This is preferred for FCC use with side or circumferential mount nozzles. When nozzles are vertically mounted, a round orifice outlet is preferred.

The orifice may operate with wedge or deflector means or blocks just upstream of, within, or downstream of the orifice, if desired. These will increase the pressure drop through the nozzle, and the increased atomization efficiency will usually not justify the increased pressure drop. Swirl vanes seem to degrade performance. Thus it is preferred to operate with an orifice outlet consisting essentially of an orifice, preferably a slotted orifice with an angle less than 180 degrees defining a fan shaped spray.

The slotted orifice is preferred for side mounted nozzles, because experiments have shown that such a shape efficiently distributes the atomized mixture into the riser reactor. Although a prior art slot orifice, such as shown in FIG. 1 or 2 can be used, it is preferred to use a slot which is shortened away from the tangent line of the cap, as shown in FIG. 3 or 4. The slot orifice shown in FIG. 3 and 4 will produce a spray angle of approximately 70°–80°, which is a better spray angle for FCC than that produced by a slot orifice with an opening of 180°.

Use of a slot orifice with an angle from 120° to 175°, preferably from 130° to 170°, and most preferably from 145° to 165° is therefore preferred to minimize impingement of the atomized mixture on the walls of the riser reactor. Use of such a reduced angle of spray allows the slotted orifice to be placed fairly near the walls of the riser reactor, without eroding the riser wall. Alternatively, the nozzle assembly can be inserted further into the riser reactor, with the increased distance from the riser wall providing some protection from wall erosion. Use of longer nozzles, e.g., a 180° notch and a spray pattern of around 100°, is not preferred, as erosion of the spray nozzle is more likely if it extends into the riser reactor, and disruption of catalyst flow, around the nozzles, is more likely.

FIG. 9 shows a good way to dispose FCC feed nozzles 10 in the base of an FCC riser reactor 1.

Experiments

The effectiveness of the feed mixing nozzle of the present invention, was compared to several conventional designs, including an orifice tip nozzle, and an orifice tip nozzle having a spiral outlet.

The experiments were conducted with air/water mixtures, using a standard test procedure which had proved useful for predicting nozzle performance in FCC units. Although FCC units never inject water/air mixtures, by coincidence the flowing properties of these water/air mixtures are similar to those of steam/heavy oil mixtures used in FCC units. Also by coincidence, the relative amounts of atomizing fluid and heavy liquid are numerically similar, i.e., an FCC nozzle discharging a 5,000 BPD of heavy feed and 2 wt. % atomizing steam at FCC conditions will generate about the same spray pattern as the same nozzle discharging the same weight per hour of water, with 2 wt. % air.

The experiments were conducted in two stages—an initial screening test, followed by more rigorous tests.

The screening tests were run with nozzle exit velocities of 225 and 300 ft/s, and with dispersion air rates of 1.9 and 4.8 wt. %, resulting in four combinations. Observations were qualitative—a video camera, with high shutter speed capability, was used to capture flow patterns and droplet sized more clearly. Tests were performed with the nozzles situated at 30 degrees with respect to horizontal, to simulate the orientation of nozzles in many commercial FCC's with side mounted nozzles. Air was supplied at 100 psig, using a large mobile compressor. Centrifugal pumps were used when high liquid flow rates or pressures were needed, with flow rates determined with a turbine or orifice flowmeter. The test procedure used is not critical, because the same test procedure was used for all nozzles.

Standard Commercial Nozzle—A nozzle currently used commercially in FCC units consists of a length of 3" Sch. 40 pipe, with an oil inlet (water inlet) and steam (air) inlet in a "Y" inlet, so that the atomizing fluid was added at a slant, and in the direction of liquid flow. The two fluids flow together for about 3' before exiting through a cap with a semi-circular, rectangular slot, similar to that shown in FIG. 1. Both atomization and droplet distribution were poor. Large droplets persisted in the center and edge regions of the fan shaped, flat spray, while most of the air passed between these large droplet regions. Air and water pressure drops were relatively small. For this nozzle, and most of the others, spray became more uniform and less coarse for the test cases with higher exit velocities. Slugging within the two phase region of the 3" canon was noticed at the higher flow rates.

Spiral—A commercially available spiral nozzle was also tested. This was mounted on the 3" cannon, with water and air premixed upstream. This nozzle operates by slicing off sheets from the inner cylindrical flow with a spiral cutting plane. This nozzle performed poorly at the 30° test angle since larger droplets predominated at the bottom, with a fine mist at the top. The distribution did improve substantially, however, as the water flow rate increased. This nozzle would be most effective when mounted nearly vertically. The air and water pressure drops were low to moderate. The spray contained gaps within the flow since the water remained predominantly in the spiral sheet. The angle of the spray was also moderate, roughly 65°.

Lechler Supersonic—This nozzle has a converging section, with 16 air jets, emerging from 3/16" orifices situated along four circumferential rows, which impinge perpendicularly into a cylindrical core of water. The nozzle then has a diverging section. This nozzle produced good atomization around the outer edge of the spray, but very large droplets persisted in the center. We speculated that this might result from poor air jet penetration into the water, due to low jet velocities. The air jets created a back pressure affect which caused liquid pressure drops to be high for the standard conditions, 22–45 psi. Liquid pressure drops changed dramatically with air flow rates. Air pressure drops were low, ranging from 17–28 psi. The spray angle produced by the nozzle was very narrow.

SnowJet—This nozzle, manufactured by Spraying Systems Co. feeds air and water into a mixing chamber through fairly small orifices directed toward an impacting cylinder. A 2.5' snout, with semi-circular slot, was added by us on the end to create a spray pattern and exit velocity consistent with commercial FCCU requirements. This design achieved good atomization and droplet distribution, but at the cost of very high liquid pressure drop. When flow rates were low coarse droplets began to appear at the edges of the spray. Liquid pressure drops were high, ranging from 33 psi up to 160 psi dP at the design point, while the air pressure drops were 20–55 psi. Two other caps were also tested, these were smaller ones used in snow making. They had smaller exit orifices, which increased pressure drop, and exit velocity but still achieved good atomization. These small exit orifice nozzles had too small a spray pattern, and too high an exit velocity, to have much practical utility as FCC feed nozzles.

Modifications—We made several modifications to some of the standard designs, some of which degraded performance, or resulted in unacceptable increases in pressure drop.

Adding swirl vanes upstream of the standard commercial nozzle discussed above produced a highly distorted "s" shaped spray, with coarse droplets at the edges.

We tried using a slot orifice outlet on a commercially available nozzle with internal swirl vanes. The swirling forced large droplets of water toward the edges, while the air bypassed through the middle.

Invention

We found that good atomization could be achieved using a nozzle with three sections or stages—an initial atomizing section, an impingement plug with low pressure drop expansion section, and an orifice outlet. All parts of the nozzle work together to achieve the desired result. Some conventional nozzle technology can be used in some parts of the nozzle, e.g., an initial atomizing section, or an orifice outlet, similar to that of some prior art nozzles, may be used, with some degradation in performance. Each section or stage will be reviewed in more detail below, along with some of the experimental work that went into devising each section.

Atomization

Atomizing of feed is an essential first stage in the nozzle. The atomizing section bears some resemblance to the Lechler Supersonic nozzle, but it is not the same. The following differences can be noted. Our design does not require a gradually converging section, but can simply use a length of straight pipe. Rather than add atomizing vapor at four locations (four rings of holes), the atomizing vapor is added via just two locations (two rings of eight holes). We sized the air holes to utilize fully the pressure drops available on the gas side.

The Lechler Supersonic, and similar types of nozzles, work well around the edges, but have a core problem, that is large droplets tend to persist in the center of the spray. Going to higher gas rates improves atomization, but can cause a dramatic change in liquid pressure drop.

Our preferred design which uses two rows or rings of nozzles to form "soft orifices" makes excellent use of all the pressure energy available in the atomizing gas. Our design is not believed subject to such large swings in liquid pressure drop due to variations in gas rate, because gas is added near the outlet of this section. The internal diameter of the initial section may be enlarged to accomodate more flow.

We need an initial atomization section—that much is essential. At least one stage of atomizing vapor being injected into a core of liquid via a plurality of radially distributed orifices works well. One ring of 4 orifices, located within one pipe diameter of the outlet of this section, is probably the minimum configuration, but use of 2 rows, each with 8 orifices is believed optimum.

Impingement Plug

The impingement plug, with low pressure drop expansion section, is an important part of the invention. At its simplest it need only consist of a single impingement plug having a cross-sectional area, as measured in the direction of flow ranging from 25 to 150%, and preferably from 30 to 60%, and most preferably about 40 to 55% of the upstream section or feed pipe.

It is especially beneficial if the impingement plug has a cut or ground surface, deflecting flow around the impingement pin. A very shallow cut, not more than 20°, and preferably about 10°. The plug acts as an impactor, upon which the feed strikes and further atomization occurs. The shallow cut, at the end of the plug, channels flow evenly into an annular opening around the plug. FIG. 7 shows a preferred impingement plug 50 with ground end.

The open area, or annular area around the plug should be at least as large as the open area of the feed pipe. We think the optimum open area, for the cut plug tested, is around 1.4 times the open area of the feed pipe. The relatively large open area, and the deflection action of the impingement pin, provide further atomization, especially of the large droplets that may remain in the central flow regions of the feed pipe. Preferably the annular area is defined at least in part by an expansion area, such as area 60, in which the nozzle ID makes the transition from the relatively narrow atomizing region 22 to the much larger region 62 upstream of the nozzle outlet.

Preferably there is a 5° to 30°, and most preferably a 10° to 20° angle, overall as measured from the centerline, expansion area from the oil feed pipe to the large nozzle pipe. This shallow angle minimizes pressure losses due to expansion, which allows available pressure to be used in atomization of feedstock, rather than simply lost due to passing through a sudden expansion of the pipe. The 15° shown in FIG. 5 is believed optimum. Use of more exotic shapes, such as a venturi section, may further reduce pressure drop. The preferred plug design has such a low pressure drop associated with it that the higher cost of exotic shapes will not be worth the marginal reduction in pressure drop.

Preferably the expansion region ends with a baffle effective to promote some additional mixing and uniform distribution of droplets in the region upstream of the nozzle outlet. The preferred baffle is a cross shaped means which distributes flow evenly through four large pie-shaped orifices.

Orifice Outlet

Our nozzle, like many nozzle designs of the prior art, works best with some type of orifice outlet. Although any of the conventional orifice outlets known in the art can be used (such as those shown in the Oil & Gas Journal Article previously discussed), the design works best with a slotted cap outlet such as that shown in FIG. 3 and 4. A circular orifice can be used for vertically mounted nozzles, while slots developing a relatively wide fan shaped spray can be used for nozzles mounted circumferentially around the perimeter of an FCC riser.

For use in FCC, the slot open area should be sized to provide an exit velocity of 150 to 450 fps, preferably 200 to 350 fps, and most preferably around 300 fps. This is a moderately high exit velocity, which gives the nozzle spray sufficient energy to mix well with the hot catalyst, but not so high as to attrit the catalyst nor carry across the catalyst and impinge on the opposite wall of the riser. Use of a notched or slot outlet, developing a flat, fan shaped spray, avoids formation of a strong stream of oil, which might penetrate across the riser.

In the preferred nozzle configuration, all parts function in a complementary fashion. The initial atomizing section does a good job of atomizing most of the liquid feed. The impingement plug does very little to the well atomized oil near the walls of the atomizing section, but is ideally placed to atomize the modest amount of larger droplets remaining in the central regions of the atomizing section, furthest from the wall. Mixing intensity ranges decreases radially inward from the wall of the atomizing section, while the reverse is true in the plug section, where the mixing intensity is highest in the center.

Additional mixing occurs as the well atomized mixture passes through the four pie shaped openings, and again when the mixture splits to some extent to get through the slot shaped nozzle outlet, which is preferably rotated 45° from the pie shaped openings. Here mixing intensity varies somewhat in a radial direction, assuming the nozzle is used horizontally, and the the pie shaped baffles are formed by an X, and the nozzle slot develops a horizontally distributed, flat, fan shaped spray.

Baffle/Orifice Interactions

When a notch shaped outlet, generating a flat, fan shaped spray, is used, there is a strong interaction between the baffle and the orifice, which even involves the length of the snout or nozzle barrel holding the orifice. The baffles just downstream of the impingement plug significantly improve performance when a slot outlet is used. There seems to be a significant degradation in performance, in forcing the atomized stream to shift from a generally circular distribution (around the impingement pin) to a flat fan shaped spray. Use of the the baffles, and providing sufficient length of nozzle barrel upstream of the slot orifice to let the pie shaped sprays bounce back and forth in the nozzle barrel, maintains good atomization. The optimum length of the snout, or length of pipe intermediate the slot orifice and the baffles, is about 4 pipe diameters, but from 2 to 8 pipe diameters of length should give acceptable results, with 3:1 to 6:1 ratios of length to diameter preferred.

Experiments

A series of qualitative (screening) and quantitative tests were conducted. A nozzle, very similar to that shown in FIG. 5 was used for the tests. The basic nozzle design consisted of an atomizing section (two varieties were tested), an impingement plug with pie shaped opening baffle downstream of the plug, and a length of 3" pipe with a cap with a horizontal slot at the end.

Two atomization sections were tested, one with 8, 5/32" annular air orifices which impinged upon a core of water at 45°, within a region of expansion. This is not shown in the figures. The second, and preferred, design used 16, ⅛" annular air orifices situated upstream of the expansion region.

sion section, and the second being with 16 orifices, as shown in FIG. 5.

TABLE I

Extended Data for the New Nozzles
NEW NOZZLE DESIGN WITH 16 ORIFICES

| Run Number | Air wt. % | Exit Velocity ft/s | Exit Density lb/ft3 | Water Flow gpm | Air Flow scfm | Pressure Drop (psi) Liquid | Pressure Drop (psi) Gas | Droplet size micron |
|---|---|---|---|---|---|---|---|---|
| 1 | 1.0 | 150 | 6.89 | 118 | 129 | 29 | 38.5 | 2077 |
| 2 | 1.0 | 225 | 6.89 | 177 | 194 | 56 | 65.3 | 2187 |
| 3 | 1.0 | 300 | 6.89 | 235 | 259 | 87.6 | 93.2 | 1697 |
| 4 | 2.0 | 150 | 3.68 | 62 | 137 | 15.5 | 32.9 | 1915 |
| 5 | 2.0 | 225 | 3.68 | 93 | 205 | 31 | 57.5 | 1010 |
| 6 | 2.0 | 300 | 3.68 | 124 | 273 | 47 | 80.3 | 679 |
| 7 | 5.0 | 150 | 1.57 | 26 | 142 | 6 | 35 | 1591 |
| 8 | 5.0 | 225 | 1.57 | 39 | 212 | 13.1 | 55.5 | 879 |
| 9 | 5.0 | 300 | 1.57 | 52 | 283 | 22 | 79.1 | 611 |
| 10 | 5.0 | 350 | 1.57 | 60 | 330 | 29.1 | 91.2 | 856 |

TABLE II

ALTERNATE NOZZLE DESIGN WITH 8 ORIFICES

| Run Number | Air wt. % | Exit Velocity ft/s | Exit Density lb/ft3 | Water Flow gpm | Air Flow scfm | Pressure Drop (psi) Liquid | Pressure Drop (psi) Gas | Droplet size micron |
|---|---|---|---|---|---|---|---|---|
| 1 | 2.0 | 150 | 3.68 | 62 | 137 | 7.5 | 37.5 | 1372 |
| 2 | 2.0 | 225 | 3.68 | 93 | 205 | 18 | 57 | 1042 |
| 3 | 2.0 | 300 | 3.68 | 124 | 273 | 28 | 88.8 | 747 |
| 4 | 5.0 | 150 | 1.57 | 26 | 142 | 2 | 36 | 1959 |
| 5 | 5.0 | 225 | 1.57 | 39 | 212 | 7 | 61.5 | 1016 |
| 6 | 5.0 | 300 | 1.57 | 52 | 283 | 13 | 90.8 | 774 |

The nozzles tested were oriented vertically downward, to accommodate the analyzing equipment. A droplet size analyzer was used to digitize a black and white image of part of the spray which passes through a narrow gap in the line of sight of a video camera. A gap length of 13 mm was used for the experiments. The droplets were back illuminated by a strobing Xenon laser. To ensure statistical significance, data were acquired so that at least 10,000 droplets were analyzed. To avoid including erroneously large drops, usually due to splattering, we excluded any single droplet that contributed to more than 10% of the volume of all droplets. This rarely had to be done, though, since the possibility of this happening was reduced by counting large numbers of droplets during each test. Droplet size reported is the Sauter mean droplet size, defined as the diameter of a sphere which has the same volume/surface area ratio as that of the test droplets. Tests were run at various nozzle exit velocities, and with varying amounts of air.

Additional tests were then conducted to determine the effectiveness of the slotted orifice outlet. The same nozzle body was used, for all tests, with both types of atomization sections. In one set of tests, no impingement plug or cap was used. This produced a relatively narrow spray angle of 20°-30°. In the other series of tests, the 0.8"×2.9" slot in a cap was affixed to the end of the nozzle. The tests are presented in two groupings, the first being with 8 orifices discharging air into the expan-

TABLE III

Extended Data for the New Nozzles
NEW NOZZLE DESIGN
Exit size: 0.8" × 2.9"
Spray Angle: 60–80 Degree with Plug and Cap
20–30 Degree (No Plug and Cap)

| New Nozzle Design Options | Exit Velocity ft/sec | Gas wt % | Pressure Drop Liquid | Pressure Drop Gas | Droplet size micron |
|---|---|---|---|---|---|
| 8 Steam Orifices | | | | | |
| No Plug and Cap | 225 | 2 | 4 | 62.7 | 2203 |
| w/Plug and Cap | 225 | 2 | 18 | 57 | 1042 |
| No Plug and Cap | 300 | 5 | 2 | 88 | 1111 |
| w/Plug and Cap | 300 | 5 | 13 | 90.8 | 774 |
| 16 Steam Orifices | | | | | |
| No Plug and Cap | 225 | 2 | 25 | 55.5 | 1190 |
| w/Plug and Cap | 225 | 2 | 31 | 57.5 | 1010 |
| No Plug and Cap | 300 | 5 | 18 | 84.7 | 676 |
| w/Plug and Cap | 300 | 5 | 22 | 79.1 | 611 |

Discussion of Test Results

These tests show that our preferred nozzle functions very well using a combination of initial atomization, impaction, and expansion.

Our nozzle should be widely applicable in refinery and petrochemical processes, and not subject to plugging. The only fine holes in our preferred design are used to admit high pressure steam to the initial atomizing section. The portions of the nozzle wet by hydrocarbon oil (or other liquid feed) are relatively open, i.e., the cross sectional area available for flow around the impingement plug 50 is larger than the cross sectional area available for fluid flow in the initial atomization section 22.

As applied to hydrotreaters, the use of such a nozzle will significantly improve catalyst use and minimize channelling of feed through the fixed bed of hydrotreating catalyst.

As applied to hydrocrackers, the use of our nozzle will greatly improve the efficiency and the safety of the process, by preventing liquid maldistribution, which can lead to localized areas of high temperature which tend to travel through the hydrocracking bed and get worse. Our nozzle can be used for adding liquid feed, and/or liquid quench to hydrocrackers.

The nozzle of the present invention may also be used to add any essentially solids free vapor/liquid phase to any refinery unit operation. The efficiency of packed towers will be greatly improved if the feed is added via an orifice tip nozzle with swirl vanes. In such an application the vapor present in the two phase feed will usually be sufficient to disperse the liquid over the packed column.

We claim:

1. An atomizing nozzle comprising:
   an initial atomizer having a generally cylindrical inner surface having an axis, a diameter and a cross sectional area, a first end, a second end, a borehole extending from the first end to the second end, a liquid feed inlet connected with the first end, a plurality of radially distributed atomizing gas inlets drilled through said initial atomizer and within one diameter of the second end;
   an impingement atomizer having an axis which is axially aligned with the axis of said initial atomizer, a first end, a second end, a generally cylindrical plug having a diameter, a plug first end near said second end of said initial atomizer and a plug second end, said plug in axial alignment with said initial atomizer and wherein said plug first end is in open fluid communication with said second end of said initial atomizer;
   an annular expansion region consisting of a truncated cone having an angle of less than 20°, a first end near the apex of said cone connected with said second end of said initial atomizer and a second end connected with a cylindrical nozzle barrel, said second end of said annular expansion region enveloping said impingement atomizer;
   said cylindrical nozzle barrel having an axis and axially aligned with said initial atomizer, said nozzle barrel having a cross sectional area at least twice as large as the cross sectional area of said initial atomizer, a first end connected with the second end of said annular expansion region, and a second end connected with an orifice outlet.

2. The atomizing nozzle of claim 1 wherein said initial atomizer is a length of pipe and:
   said first end of said pipe is connected with a source of liquid feed,
   said second end of said pipe has an unobstructed or open outlet, and
   said pipe further includes an atomizing gas distribution section having an inlet for atomizing gas and an outlet encompassing said plurality of atomizing gas inlets.

3. The atomizing nozzle of claim 1 wherein said plug is supported at said plug second end.

4. The atomizing nozzle of claim 3 wherein said plug is supported by an X or cross-shaped support means.

5. The atomizing nozzle of claim 4 wherein said support means has a cross sectional area, perpendicular to fluid flow, of 40 to 60% of the area available for fluid flow immediately upstream of said support means for splitting fluid flow through said support means into four pie shaped streams.

6. The atomizing nozzle of claim 1 wherein said nozzle barrel orifice outlet comprises a dome or 180° hemispherical cap with a rectangular slot opening.

7. The atomizing nozzle of claim 6 wherein said slot opening produces a spray angle of 35° to 120°.

8. The atomizing nozzle of claim 7 wherein said spray angle is 40° to 90°.

9. The atomizing nozzle of claim 7 wherein said spray angle is 70° to 80°.

10. The atomizing nozzle of claim 7 wherein said rectangular slot opening generates a flat, fan shaped spray.

11. The atomizing nozzle of claim 7 wherein said cylindrical nozzle barrel has a length and a diameter, and the ratio of the length to diameter ranges from 3:1 to 6:1.

12. The atomizing nozzle of claim 11 wherein said nozzle barrel has a length to diameter ratio of 4:1.

13. The atomizing nozzle of claim 1 wherein said nozzle barrel has a cross sectional area two to six times as large as the cross sectional area of said borehole of said initial atomizer.

14. The atomizing nozzle of claim 1 wherein said nozzle barrel has a cross sectional area four times as large as the cross sectional area of said borehole of said initial atomizer.

15. An atomizing nozzle comprising:
   an initial atomizer having a generally cylindrical inner surface having an axis, a diameter and a cross sectional area, a first end, a second end, a borehole extending from the first end to the second end, a liquid feed inlet connective with the first end, a plurality of radially distributed atomizing gas inlets drilled through said cylinder and within one diameter of the second end;
   an impingement atomizer having an axis which is axially aligned with the axis of said initial atomizer, a first end, a second end, a generally cylindrical plug having a diameter, a plug first end near said second end of said initial atomizer and a plug second end, said plug in axial alignment with said initial atomizer and wherein said plug first end is in open fluid communication with said second end of said initial atomizer;
   an annular expansion region consisting of a truncated cone having an angle of less than 20°, a first end near the apex of said cone connective with said second end of said initial atomizer and a second end connective with a cylindrical nozzle barrel, said second end of said annular expansion region enveloping said impingement atomizer;
   said cylindrical nozzle barrel having an axis axially aligned with said initial atomizer, a diameter at least twice as large as the diameter of said initial atomizer, a first end connective with the second end of said annular expansion region, and a second end connective with an orifice outlet.

* * * * *